US012712796B2

(12) United States Patent
Looney et al.

(10) Patent No.: US 12,712,796 B2
(45) Date of Patent: Aug. 18, 2026

(54) METHOD OF MEASURING NETWORK JITTER

(71) Applicant: ARRIS Enterprises LLC, Suwanee, GA (US)

(72) Inventors: Humphrey Looney, Cork (IE); Kevin Brian Garvey, Cork (IE); Christopher T. Harrison, Cork (IE); Damien Tuffy, Cork (IE); Yair Neugeboren, Netanya (IL); Stephen Graham Dunning, Cork (IE)

(73) Assignee: ARRIS Enterprises LLC, Horsham, PA (US)

( * ) Notice: Subject to any disclaimer, the term of this patent is extended or adjusted under 35 U.S.C. 154(b) by 347 days.

(21) Appl. No.: 18/217,471

(22) Filed: Jun. 30, 2023

(65) Prior Publication Data

US 2024/0007379 A1 Jan. 4, 2024

Related U.S. Application Data

(60) Provisional application No. 63/357,934, filed on Jul. 1, 2022.

(51) Int. Cl.

*H04L 43/087* (2022.01)
*H04L 65/60* (2022.01)
*H04L 65/80* (2022.01)

(52) U.S. Cl.

CPC ............ *H04L 43/087* (2013.01); *H04L 65/60* (2013.01); *H04L 65/80* (2013.01)

(58) Field of Classification Search

CPC ....... H04L 43/087; H04L 65/60; H04L 65/80; H04L 49/9023; H04L 43/16; H04L 47/283; H04N 21/23406; H04N 21/2383; H04N 21/2389; H04N 21/2401; H04N 21/2402; H04N 21/242; H04N 21/4305; H04N 21/6118; H04N 21/42676

See application file for complete search history.

(56) References Cited

U.S. PATENT DOCUMENTS

| | | | | |
|---|---|---|---|---|
| 7,701,980 | B1 * | 4/2010 | Bugenhagen | H04L 1/205 370/395.2 |
| 7,916,742 | B1 * | 3/2011 | Bugenhagen | H04L 47/10 370/417 |
| 2006/0045139 | A1 * | 3/2006 | Black | H04L 47/2416 704/E19.003 |
| 2015/0295669 | A1 | 10/2015 | Chapman et al. | |
| 2018/0262435 | A1 | 9/2018 | Brisebois et al. | |
| 2020/0195361 | A1 | 6/2020 | Neugeboren | |
| 2022/0174341 | A1 | 6/2022 | Neugeboren et al. | |

FOREIGN PATENT DOCUMENTS

| | | | | |
|---|---|---|---|---|
| EP | 1931068 A1 * | 6/2008 | | H04L 49/9023 |
| EP | 3343851 A1 * | 7/2018 | | H04L 47/801 |
| WO | WO-2011008789 A1 * | 1/2011 | | H04L 65/765 |

OTHER PUBLICATIONS

International Search Report and Written Opinion RE: Application No. PCT/US23/26813, dated Sep. 18, 2023.

* cited by examiner

*Primary Examiner* — Cheikh T Ndiaye

(74) *Attorney, Agent, or Firm* — Chernoff, Vilhauer, McClung & Stenzel, LLP

(57) ABSTRACT

Systems and methods for measuring the amount of jitter in a network providing data to a remote device in a distributed access architecture based on a measured queue depth in a dejitter buffer relative to a plurality of different adjustable thresholds.

17 Claims, 6 Drawing Sheets

100
102
CORE
108
CLOCK
VIDEO
112
TIMING GM
106
SYNC MODE
RPD
CLOCK
110
CIN
VIDEO (OVER DEPI L2TPV3)
116
DEJITTER
118
NULL INSERTION (DUE TO MISSING L2TPV3 PACKETS)
MPEG
120
DOWNSTREAM PHY
114
104

101
102
CORE
108
CLOCK
VIDEO
112
ASYNC MODE
RPD
CLOCK
110
CIN
VIDEO (OVER DEPI L2TPV3)
116
DEJITTER
118
NULL INSERTION / REMOVAL (DUE TO CLOCK DIFFERENCES)
119
MPEG PCR ADJUSTMENTS
MPEG
120
DOWNSTREAM PHY
114
104

METHOD OF MEASURING NETWORK JITTER

CROSS REFERENCE TO RELATED APPLICATIONS

This application claims the benefit of U.S. Provisional Patent Application Ser. No. 63/357,934 filed Jul. 1, 2022.

BACKGROUND

The subject matter of this application generally relates to delivery of video content using distributed access architectures (DAA) of a hybrid CATV network, and more particularly to architectures that distribute the functions of the Cable Modem Termination System between a core and a remote device synchronized to the core, such as a Remote PHY device or Remote MACPHY device.

Although Cable Television (CATV) networks originally delivered content to subscribers over large distances using an exclusively RF transmission system, modern CATV transmission systems have replaced much of the RF transmission path with a more effective optical network, creating a hybrid transmission system where cable content terminates as RF signals over coaxial cables, but is transmitted over the bulk of the distance between the content provider and the subscriber using optical signals. Specifically, CATV networks include a head end at the content provider for receiving signals representing many channels of content, multiplexing them, and distributing them along a fiber-optic network to one or more nodes, each proximate a group of subscribers. The node then de-multiplexes the received optical signal and converts it to an RF signal so that it can be received by viewers. The system in a head end that provides the video channels to a subscriber typically comprises a plurality of EdgeQAM units operating on different frequency bands that are combined and multiplexed before being output onto the HFC network.

A traditional HFC architecture includes a head end having a Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern HFC CATV systems have combined the functionality of the CMTS with the video delivery system in a single platform called the Converged Cable Access Platform (CCAP).

In these traditional HFC architectures, the video is modulated onto the RF network by a video Edge QAM (VEQ). A VEQ receives Internet-Protocol (IP) encapsulated Single & Multiple Program Transport Streams (SPTSs & MPTSs) from various sources (unicast/multicast) and, after removing any jitter from the network ingress stream, statically or dynamically maps these streams onto a QAM channel via one or more ports of the VEQ, remapping program identifiers (PIDs), while multiplexing as necessary individual SPTSs into a single MPTS. The VEQ may also perform local encryption of the video's elementary streams (ESs).

As networks have expanded and head ends have therefore become increasingly congested with equipment, many content providers have recently used distributed architectures to spread the functionality of the CMTS/CCAP throughout the network. This distributed architecture keeps the cable data and video signals in digital format as long as possible, extending the digital signals beyond the CMTS/CCAP deep into the network before converting them to RF. It does so by replacing the analog links between the head end and the access network with a digital fiber (Ethernet/PON) connection.

One such distributed architecture is Remote PHY (R-PHY) distributed access architecture that relocates the physical layer (PHY) of a traditional CMTS or CCAP—including the VEQs—by pushing the physical layer to the network's fiber nodes. Thus, while the core in the CMTS/CCAP performs the higher layer processing, the R-PHY device in the node converts downstream video data packets sent by the core from digital to analog to be transmitted on radio frequency, and also converts the upstream RF data sent by cable modems from analog to digital format to be transmitted optically to the core. Another distributed access architecture is Remote MAC PHY (R-MACPHY) where, not only is the physical layer of the traditional CMTS pushed into the network, but the functionality Media Access Control (MAC) layer, which is one of the two layers that constitute the data link layer of a transport stream, is also assigned to one or more nodes in the network in what is called a Remote MACPHY device (RMD).

In DAA architectures, it is therefore the remote video capable devices, such as an RMD and RPD, that include the VEQs that modulate a fully formed MPTS stream, sent by a core, onto the RF network. One benefit of this arrangement is that RMD/RPD devices are generally lower power than a traditional Video Edge QAMs located in a head end, and need lower computational and memory resources. Similar to a VEQ located in a head end, a VEQ located in an RPD/RMD must map and modulate an IP-encapsulated, fully formed MPTS video stream it receives from a head end onto one or more QAM channels (one stream per channel), removing network jitter in the process. The difference relative to a VEQ in a head end, however, is that a VEQ in a remote device only receives a fully-encapsulated MPTS stream, hence does not need to multiplex together various SPTS content.

As indicated earlier, remote devices receive video transport streams from a packetized network subject to jitter. This jitter not only must preferably be removed, but the amount of jitter experienced in a network should preferably be monitored because if jitter becomes too excessive, buffer underruns or overruns may occur.

What is desired therefore, are improved systems and methods for accurately determining the amount of network jitter in video packets delivered to remote devices in distributed access architectures.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

The disclosed systems and methods will be described using a distributed access architecture that provides video and data, but those of ordinary skill in the art will appreciate that the disclosed embodiments may be used in other synchronized architectures that are subject to holdover, and that provide data to a remote device that is stored in a dejitter buffer.

Figure 1:
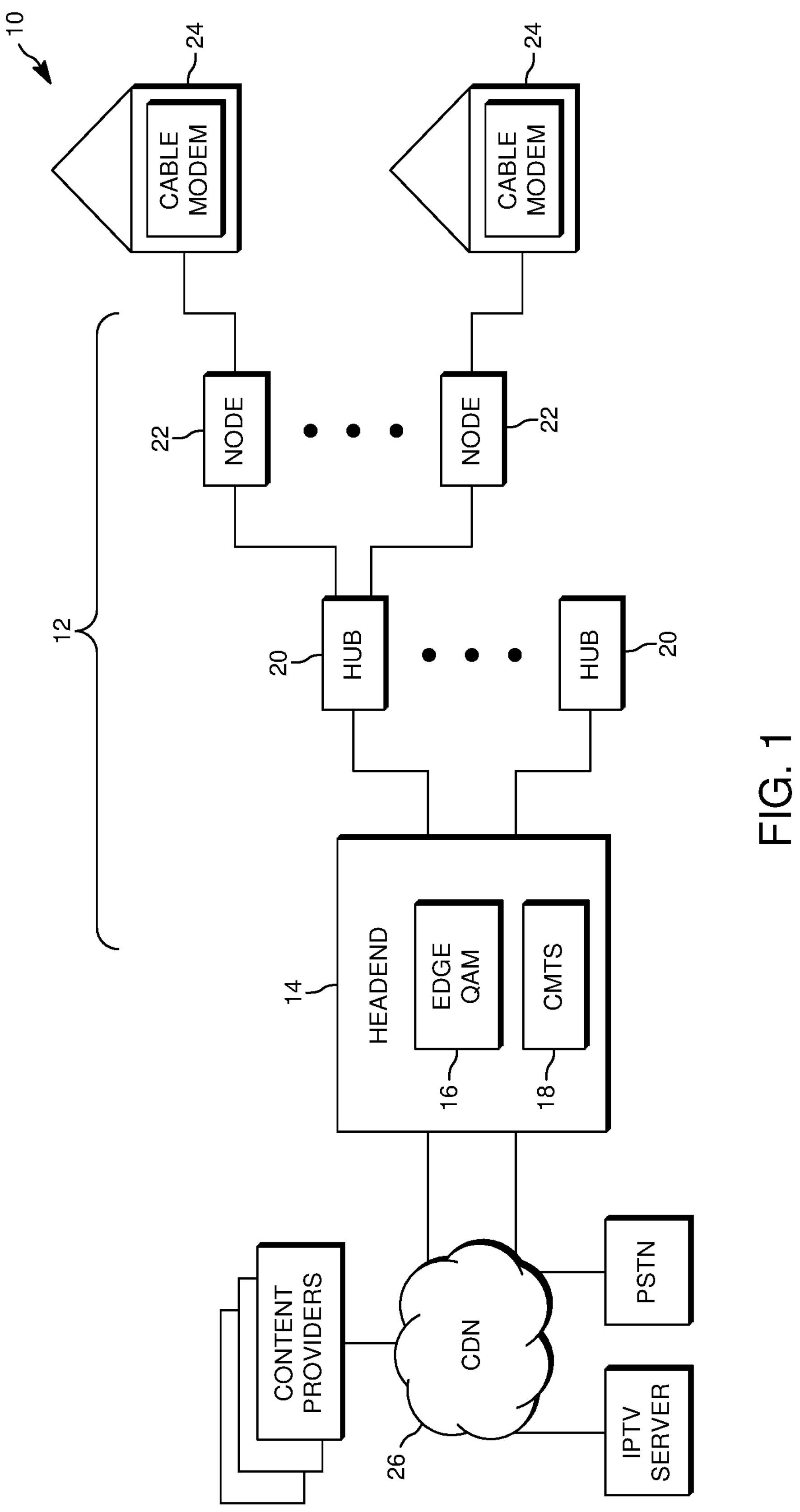
FIG. 1 shows an exemplary traditional HFC architecture having video EQAM units, which package MPTS transport streams to send to downstream nodes.

As noted previously, video EQAM (VEQ) devices are used to receive a large number of channels of video, and output an RF-modulated (i.e., QAM or quadrature amplitude modulated) signal combining the multiple different channels that the VEQ receives. FIG. 1, for example, shows a traditional architecture 10 by which an HFC network 12 includes a head end 14 that delivers content to subscriber equipment 24 as subscriber premises, shown in the figure as a cable modem but those of ordinary skill in the art will understand that subscriber equipment could include set-top boxes, gateways, wireless phones, computers, etc.

The HFC network 12 includes a head end 14, a plurality of hubs 20, and associated with each hub, a plurality of nodes 22 and a plurality of subscriber equipment 24 such as cable modems. The head end 14 typically includes a cable modem termination system (CMTS) 13 and a plurality of video EQAM units 16. Each of the nodes 22 has one or more corresponding access points, and each subscriber may have one or more corresponding network elements 24, shown in FIG. 1 as a cable modem.

As also noted previously, in these traditional HFC architectures 10, video is modulated onto the RF network by VEQs 16, which receives Internet-Protocol (IP) encapsulated Single & Multiple Program Transport Streams (SPTSs & MPTSs) from various sources (content providers, etc.) through content delivery network 26. The content delivery network is typically a switching network by which packetized IP data is routed from one address to another and may exhibit unpredictable and variable delays in the packets received. Therefore, the VEQ 16 preferably removes this jitter from the network ingress stream before mapping and modulating the video data onto a plurality of QAM channels. As also noted earlier, to deliver an MPTS stream onto a QAM channel in accordance with ISO 13818-1 requires that the VEQ recover the ingress Program Clock Reference (PCR) values encoded within each transport stream and re-stamp it with the VEQ's internal 27 MHz clock so that all streams are delivered with the same time base.

Figure 2:
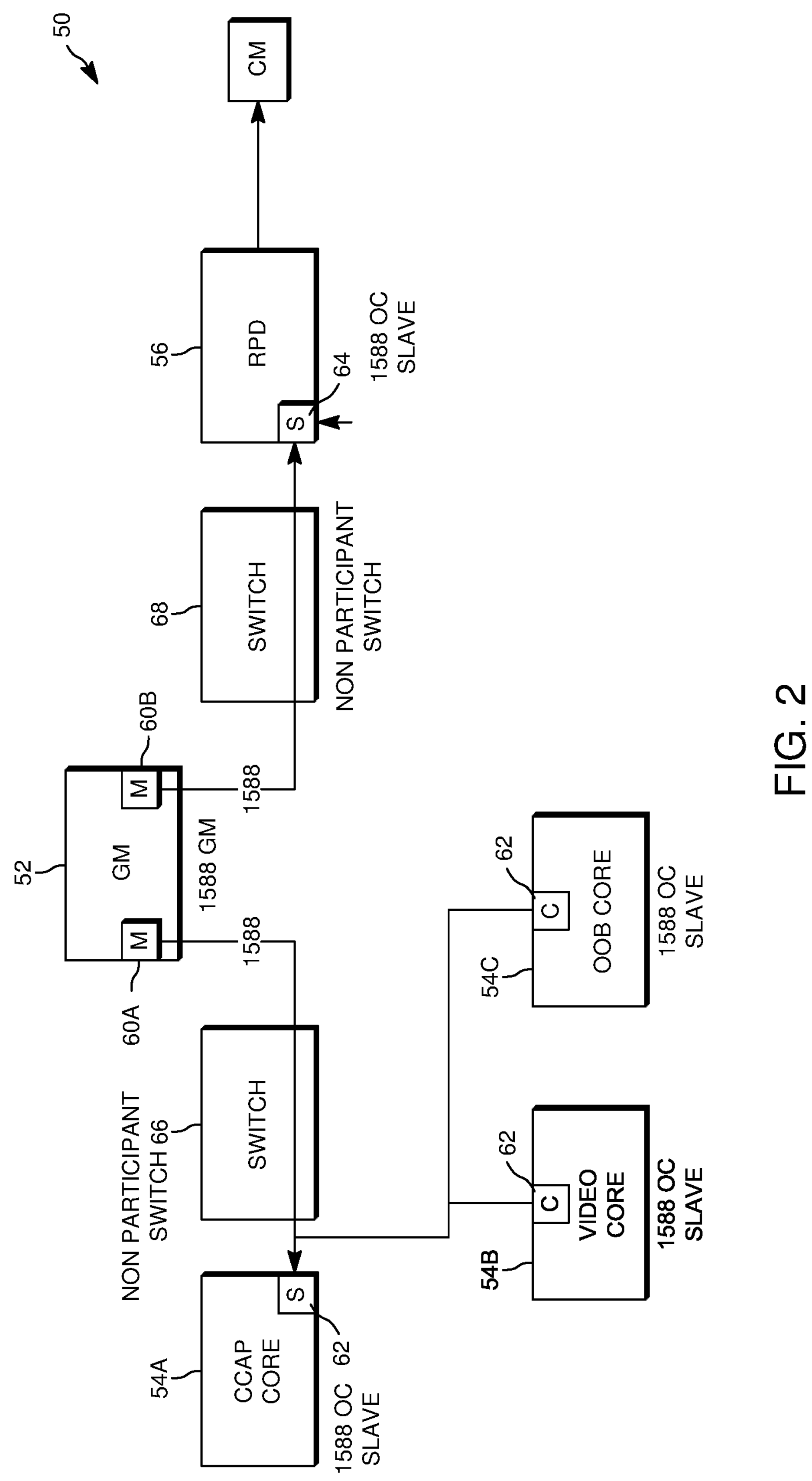
FIG. 2 shows an exemplary architecture that includes a plurality of cores, that each send data and/or video to a remote physical device (RPD).

FIG. 2 shows an alternate distributed access architecture (DAA) in which some of the functionality of the VEQ is moved to a node. Specifically, FIG. 2 shows what is known as n Remote-Physical Architecture (R-PHY) 50 in which one or more of cores, such as a CCAP core 54*a*, a video core 54*b*, an 00B core 54*c*, etc., send data to a Remote Physical Device (RPD) 56, which is in turn connected to one or more "consumer premises equipment (CPE) devices 18 such as a set-top box, cable modem, etc. Though an R-PHY architecture is illustrated in FIG. 2, it should be understood that the description herein may be equally applicable to other DAA architectures, such as R-MACPHY architectures, for example. In some embodiments, a timing grandmaster device 52 may be available to provide timing information to both the video/CCAP/OOB cores 54*a*-54*c* and the RPD 56. Specifically, the timing grandmaster 52 has a first master port 60*a* connected to slave clocks 62 in the CCAP core 54 and a second master port 60*b* connected to slave clock 64 in the RPD 56, though alternatively the respective slave clocks 64 of the core 54*a*-54*c* and the RPD 56 may both be connected to a single master port in the timing grandmaster device 52. The cores 54*a*-54*c* may be connected to the timing grandmaster 52 through one or more switches 66 while the RPD 56 may be connected to the timing grandmaster 52 through one or more switches 68. Although FIG. 2 shows only one RPD 56 connected to the timing grandmaster 52, many such RPDs may be simultaneously connected to the grandmaster 52, with each RPD having a slave clock 64 receiving timing information from a port 60*b* in the grandmaster clock 52.

Even though the architecture of FIG. 2 shows a common grandmaster device 52 capable of synchronizing the video/CCAP/OOB cores 54*a*-54*c* to the RPD 56, the architecture of FIG. 2 may be also configured to operate asynchronously with respect to video data, where the grandmaster device 52 does not send common timing information to the RPD 56 relative to the video core 54*b*. For example, the RPD 56 may be configured to operate asynchronously if the video core 54*b* does not support IEEE1588 timing protocols, or if the RPD 56 is desired to be more resilient to holdover periods in the case the RPD and/or the core loses connection to the timing grandmaster and a specified threshold amount of drift is exceeded. Moreover, in an R-MACPHY system, an RMD will typically be set to async mode by default to eliminate the need for 1588 timing, since DOCSIS services do not need it although the RMD may be switched to sync mode if other services such as wireless backhaul requires IEEE 1588 services, or if the oscillator of the video core 54*b* is of poor quality and needs an external timing source. Therefore, the system shown in FIG. 2 may be configured to either operate in sync mode or in async mode to process video content, and the video core 54*b* and RPD (RMD) 55 each therefore may in some embodiments include hardware capable of operating in either mode, with software that enables configuration by a video core of itself and connected downstream devices into either alternate one of these modes when setting up video channels.

In sync (synchronous) mode, the RPD (or RMD) and its video core 102 are synchronized in time to the same reference clock. In this sync mode, the RPD is required to detect lost video packets using the Layer 2 Tunneling Protocol v. 3 (L2TPv3) sequence number monitoring, and insert MPEG null packets for each missing packet. FIG. 3, for example, shows a system in a configuration 100 where a video core 102 communicates with an RPD 104 in synchronous mode using a common grandmaster timing server 106. The timing server 106 maintains an identical timing lock (i.e. frequency and phase) with both the clock 108 in the video core 102 and the clock 110 in the RPD 104. The video core 102 has a video streamer 112 that forwards video data packets to the RPD 104 according to the Downstream External PHY Interface (DEPI) protocol using L2TPv3. The video DEPI packets sent from the video core 102 to the RPD 104 will typically include all information necessary to decode the packetized elementary video transport stream, such as Program Identifiers (PIDs), Program Clock Reference (PCR) data, etc.

The RPD 110 in turn, receives the video packets sent from the video core 108 in a dejitter buffer 116 of a processing device 114. The dejitter buffer 116 receives and outputs packet data at a rate that removes network jitter resulting from differing paths of received packet data, or other sources of varying network delay between the video core and the RPD. Because some packets sent by the video streamer 112 may be lost or misplaced during transport to the RPD 104, the packets output from the dejitter buffer 116 may preferably be forwarded to a module 118 that, in the case of sync mode, inserts null packets in the data stream to account for those lost packets, so as to maintain the proper timing rate of the transmitted video. The transport stream, with any necessary insertion of null packets is then forwarded to a PHY device 120, which may decode the packetized elementary stream into a sequence of decoded video frames for downstream delivery to end-users by outputting QAM-modulated data in a format expected by customer-premises equipment, like set-top boxes. Alternatively, the PHY device may simply forward the packetized data, without decoding, to e.g., a cable modem for decoding by a user device such as a computer, tablet, cell phone, etc.

In sync mode, because the RPD 104 and its Video Core 102 must be synchronized to the same reference clock, the frequency of the PCR clock contained within the ingress MPTS matches that of the local clock on the remote device. Therefore, there is no frequency offset on the RPD between the ingress and egress streams, and as noted earlier, to maintain proper timing information in the video data being transmitted, the RPD 104 need only remove network jitter, detect lost video packets using the L2TPv3 Sequence number monitoring, and insert MPEG NULL packets for each missing packet.

Alternatively, however, the RPD and video core may be configured to operate in an asynchronous (async) mode. In async mode, the RPD 104 and its video core 102 are not synchronized in time to the same reference clock. Instead, the RPD 104 is required to detect the difference between its own clock 110 and the clock 108 of the video core 102 and be able to either insert or remove MPEG packets as necessary to maintain expected MPEG bitrate, and also adjust the MPEG PCR values due to the removal/insertion of the MPEG packets.

Figures 3A, 3B:
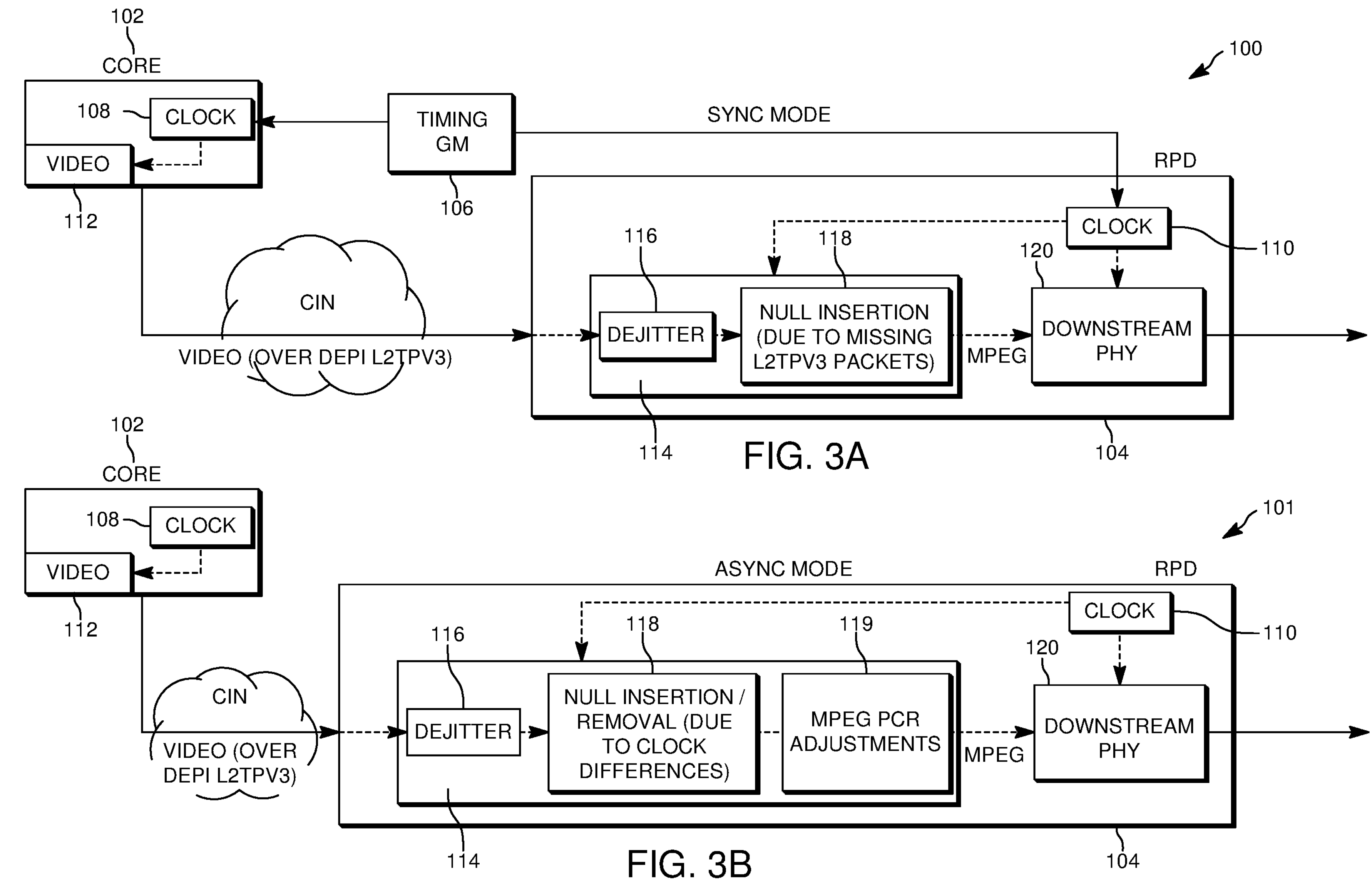
FIG. 3A shows an exemplary system where the video/CCAP core of FIG. 2 transmits video data to the RPD in sync mode.
FIG. 3B shows an exemplary system where the video/CCAP core of FIG. 2 transmits video data to the RPD in async mode.

FIG. 3B, for example, shows the hardware of FIG. 2 configured to instead operate in async mode. In this configuration 101, the clock 108 of the video core 102 and the clock 110 of the RPD 104 are not synchronized and may therefore drift relative to each other. The video streamer 112 of the video core 102 forwards packets of the packetized video data elementary stream to the RPD 104, which again receives the data in dejitter buffer 116 to remove network jitter, as described previously. However, unlike the configuration of FIG. 2, the packets output from the dejitter buffer 116 are forwarded to the module 118 which both adds null packets when needed, and drops packets when needed, in order to maintain the proper constant bit rate of the data received from the dejitter buffer 116.

Further, because the RPD and its video core are not synchronized in time to the same reference clock, the frequency of the PCR in the ingress MPTS will be offset from that of local RPD clock. Thus, as well as performing the above functions common to those performed in sync mode, the RPD must also detect the magnitude of the frequency offset from the video core and correct for it. To this end, after packets are added/dropped as needed, a PCR module 119 re-stamps the video packets with updated PCRs due to the removal/insertion of MPEG packets before forwarding the re-stamped packets to the PHY device 120.

As noted earlier, excessive jitter in a dejitter buffer may adversely affect its performance. The amount of network jitter determines the available depth of the dejitter buffer, since the buffer cannot empty or fill to a point so close to the buffer boundaries that jitter may cause packets to drop. When the clocks of a remote device and the video core sending it packets are synced, network jitter typically does not reduce buffer depth greatly; even though jitter causes fluctuations in the buffer depth, so long as the jitter is not severe, the buffer should not drop packets because the jitter manifests as deviations randomly occurring on either side of the interpacket gap (the temporal spacing between sequential packets) with no net drift. However, when the clocks of the remote device and the video core are not in sync, which may occur for example when a remote device is set to operate in async mode or even during sync mode but during a period of holdover when a timing lock to an external clock is lost, drift will occur due to the difference in the clock rates that govern ingress and egress from the dejitter buffer, respectively. In this instance it becomes important to closely monitor both the depth of the dejitter buffer and the amount of network jitter to prevent packet loss. Current techniques employ software solutions that periodically polls the buffer depth to measure drift, but such software polling techniques are relatively slow, polling queues every 10 ms to 100 ms for example. Thus, these techniques are not as accurate as may be desired.

Disclosed are novel systems and methods that improve the accuracy of measuring jitter. Specifically, referring to FIG. 4, improved systems and methods may employ a dejitter buffer 200 that includes an input 202 for receiving video frames and an output 204 for removing video frames. The dejitter buffer 200 may in some embodiments be included in a remote device such as RPD 104 shown in FIGS. 3A and 3B, or an RMD, or any other such remote device. Those of ordinary skill in the art will also appreciate that, although this description describes the disclosed embodiments with reference to a buffer 200, that buffer 200 may be considered to be a particular queue within a physical buffer (memory) defining several such queues. The buffer 200 is preferably initially configured to operate at a nominal or average buffer depth 206. For example, if the buffer 200 is sized to contain 256 DEPI frames of video, the initial target depth may be set to 128 DEPI frames of video.

Jitter manifests in a buffer as variations in the buffer depth around an average value, though it should be noted that this average value may drift due to lack of synchronization, or even randomly by small amounts during synchronization. Accordingly, a measurement of a current, near-instantaneous variance in buffer depth around a mean is a measurement of jitter. Thus, the buffer 200 is also managed to monitor the current buffer depth relative to an upper adjustable threshold 208 and a lower adjustable threshold 210. The depth of the buffer 200 may be monitored upon the receipt of every DEPI frame (a measurement interval) to determine whether either of these thresholds is being exceeded, or is not being exceeded. When either threshold is exceeded during a given measurement interval, that event may be detected and the threshold expanded outwards by an incremental amount, but if the threshold is not exceeded during the measurement interval or some other defined interval, it is expanded inward. Each threshold may be moved independently, and therefore the buffer width between these thresholds will very quickly reduce to a point that reflects instantaneous jitter. Thereafter, measurements of this difference will reflect a change in the amount of jitter, while also allowing the nominal buffer depth to drift.

As previously indicated, in some embodiments, the measurement interval may be set to coincide with the receipt of every DEPI frame into the buffer. Other embodiments may take measurements at other desired intervals.

Figure 4:
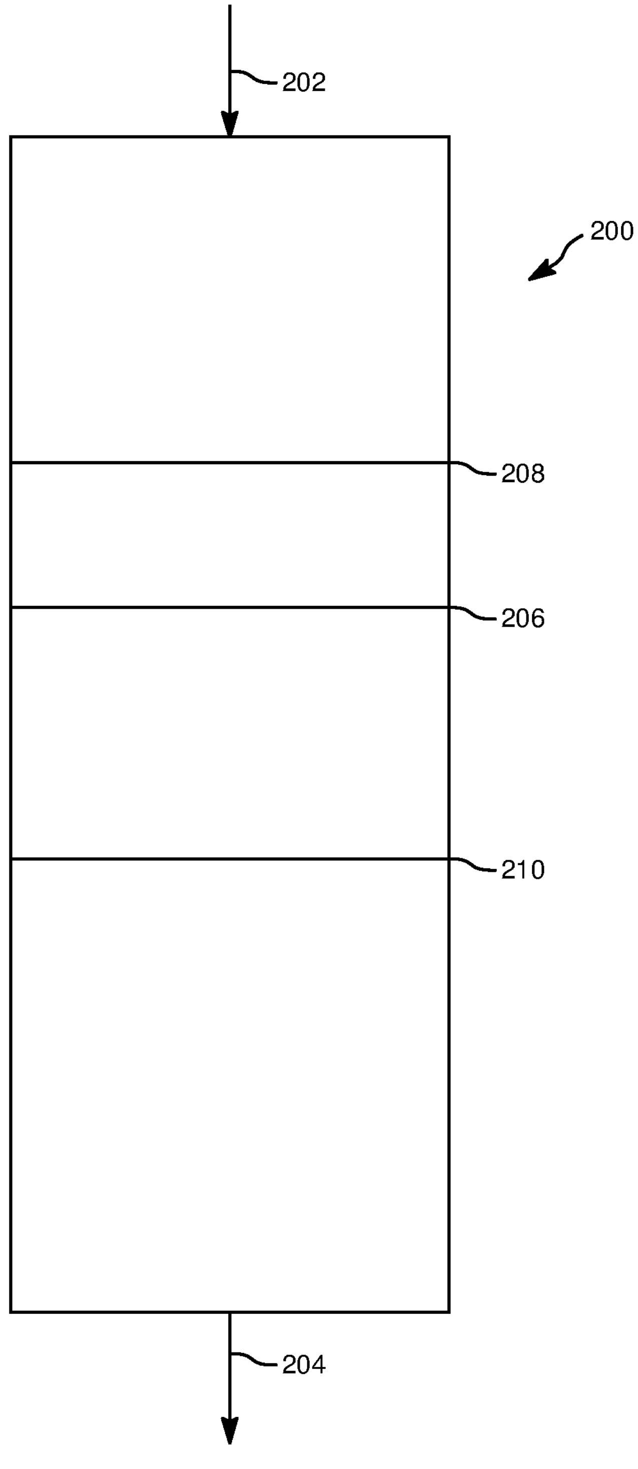
FIG. 4 shows an exemplary dejitter buffer (queue) in embodiments of the present disclosure.

Broadly, the embodiments described above determine a current level of network jitter by first measuring the amount (or volume) of the queue necessary to absorb the current network jitter, independent of a current fullness level of the queue or buffer i.e., by measuring the volume of the queue located between thresholds 208 and 210 in FIG. 4. This metric may be referred for purposes of this specification and claims as the "jitter depth" of the buffer or queue, and in preferred embodiments may be measured in units of DEPI packets, though in other embodiments other units such as kilobits may be used. Once this "jitter depth" is measured it may preferably be converted to units of time. Assuming, that the "jitter depth" is measured in units of DEPI packets, this calculation may quickly be performed using the interpacket gap (inter-frame spacing) required by the DEPI protocol. For example, DEPI packets of MPEG video transmitted at 256 QAM according to Annex B of ITU-T recommendations specify an inter-packet gap of 387 μs. Thus, the when the thresholds 208 and 210 of FIG. 4 are each set to the point just at which no threshold events occur, then the jitter can be defined as $$\text{jitter}=(\text{upper threshold level}-\text{lower threshold level})*387\ \text{us}$$

Figure 5:
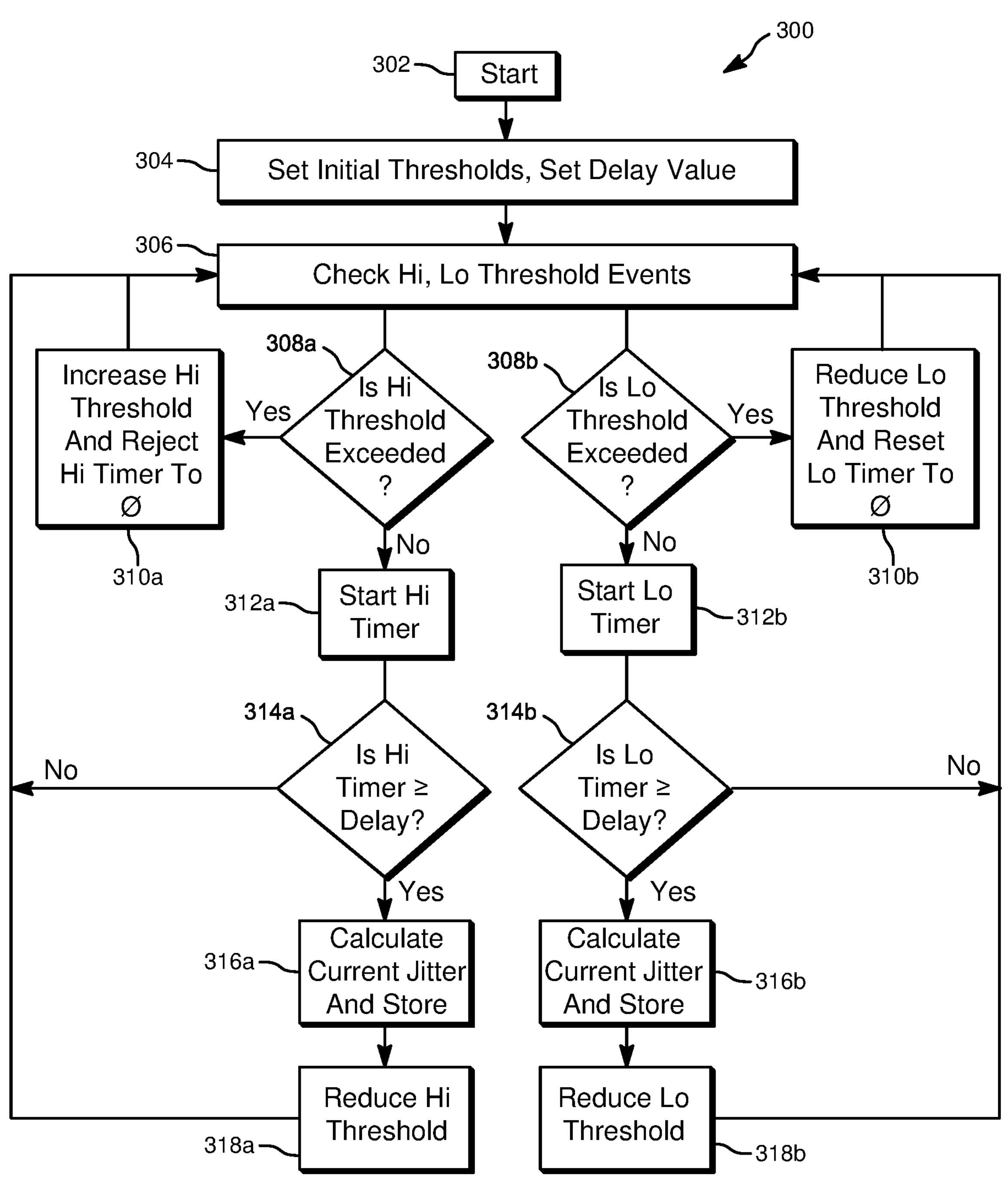
FIG. 5 shows an exemplary method according to embodiments of the present disclosure.

For example, is the upper threshold is 138 DEPI packets of queue depth and the lower threshold is 118 DEPI packets of queue depth, then the jitter is 7.74 msec FIG. 5 shows an exemplary method 300 that measures jitter according to embodiments disclosed in this specification. The method 300 uses independently adjustable high (Hi) and low (Lo) thresholds to rapidly ascertain the "jitter depth" of a queue by adjusting each threshold to a position in the queue just beyond a queue depth at which jitter will cause the respective threshold to be exceeded. This is accomplished by independently and gradually expanding the threshold levels outwards, each to a point where no threshold exceeding events are recorded, and then periodically attempting to contract the thresholds incrementally inwards until a threshold is exceeded, expanding outwards in response, and so forth. As indicated above, the object of the method 300 is to continually adjust each threshold independently to a location just beyond the point at which jitter causes the threshold to be exceeded, but to occasionally test these boundaries so as to accurately measure jitter during periods when network jitter is decreasing.

Specifically, the method 300 starts at step 302, and then at step 304 initial threshold levels for high threshold 208 and low threshold 210 are set, and a delay value is also set, which determines how long a period of time the method waits during a period when a particular threshold has not been exceeded before starting to adjust the threshold inwards (towards the other threshold) so as to capture periods when network jitter is decreasing. Preferably, the high and low thresholds are initially set close together, spaced apart from a predefined nominal queue depth 206, such as a 50% queue depth level. Each of these initial values may be selected so as to anticipate that the high and low thresholds will, at the beginning of the method 300 be exceeded. At step 306, the method checks for events where either of the high or low threshold values 208 and 210 are exceeded. This is preferably performed independently for each threshold 208, 210.

At this point, the method 300 may proceed along parallel, independent paths. For example, at step 308*a*, it is determined whether the high threshold has been exceeded. If it has, then at step 310*a* the high threshold is incrementally increased by, e.g., one DEPI packet and a timer (described later) is reset to zero, after which the method returns to step 306. If the high threshold has not been exceeded, a first threshold timer for the high threshold is started at step 312*a* and then at step 314*a* it is determined whether the timer exceeds (or optionally exceeds or equals) the delay value set on step 304. If not, the procedure again reverts to step 306; in other words, until a period of time elapses, equal to the delay value set at step 304, during which the high threshold is not exceeded, the high threshold will either retains its position or will incrementally increase (expand outward) every time the high threshold is detected as being exceeded in step 308*a*. However, if at step 314*a*, the timer exceeds (or optionally exceeds or equals) the delay value, then at step 316*a* the current jitter rate is calculated as described earlier using the current threshold positions, and the high threshold is incrementally reduced (contracted), after which the procedure again reverts to step 306. Those of ordinary skill in the art will appreciate that, so long as this reduction in the high threshold does not produce an event where the high threshold is exceeded, the timer will continue to run, and the high threshold will continue to be incrementally reduced until a point at which the high threshold is exceeded, after which the high threshold will be increased and the timer reset.

The same procedure applies independently with respect to the low threshold. Specifically, at step 308*b*, it is determined whether the low threshold has been exceeded. If it has, then at step 310*b* the low threshold is incrementally decreased by, e.g., one DEPI packet and a timer associated with the low threshold is reset to zero, after which the method returns to step 306. If the low threshold has not been exceeded, a second threshold timer for the second threshold is started at step 312*b* and then at step 314*b* it is determined whether the timer exceeds (or optionally exceeds or equals) the delay value set on step 304. If not, the procedure again reverts to step 306; in other words, until a period of time elapses, equal to the delay value set at step 304, during which the low threshold is not exceeded, the low threshold will either retains its position or will incrementally decrease (expand outward) every time the low threshold is detected as being exceeded in step 308*b*. However, if at step 314*b*, the timer exceeds (or optionally exceeds or equals) the delay value, then at step 316*b* the current jitter rate is calculated as described earlier using the current threshold positions, and the low threshold is incrementally increased (contracted), after which the procedure again reverts to step 306. Those of ordinary skill in the art will appreciate that, so long as this increase in the low threshold does not produce an event where the low threshold is exceeded, the timer will continue to run, and the low threshold will continue to be incrementally increased until a point at which the low threshold is exceeded, after which the low threshold will be reduced and the timer reset.

Those of ordinary skill in the art will appreciate that the method 300 shown in FIG. 5 may easily be modified without departing from the principles herein described. For example, though each of the high and low thresholds 208 and 210 are preferably adjusted independently, the method 300 may be modified to eliminate the parallel tracks just described by determining whether either threshold is exceeded, adjusting a respectively exceeded threshold outward if so, resetting a single timer when either threshold is exceeded, and jointly contracting the thresholds only when neither of the thresholds has been exceeded for the delay value set in step 304, but thereafter continuing to contract a particular threshold until it has been exceeded.

Furthermore, although the method 300 shows jitter being quantitatively calculated and stored at step 316*a*, 316*b*, this calculation may instead in some embodiments be performed after the thresholds are reduced in steps 318*a*, 318*bm* etc.

Figure 6:
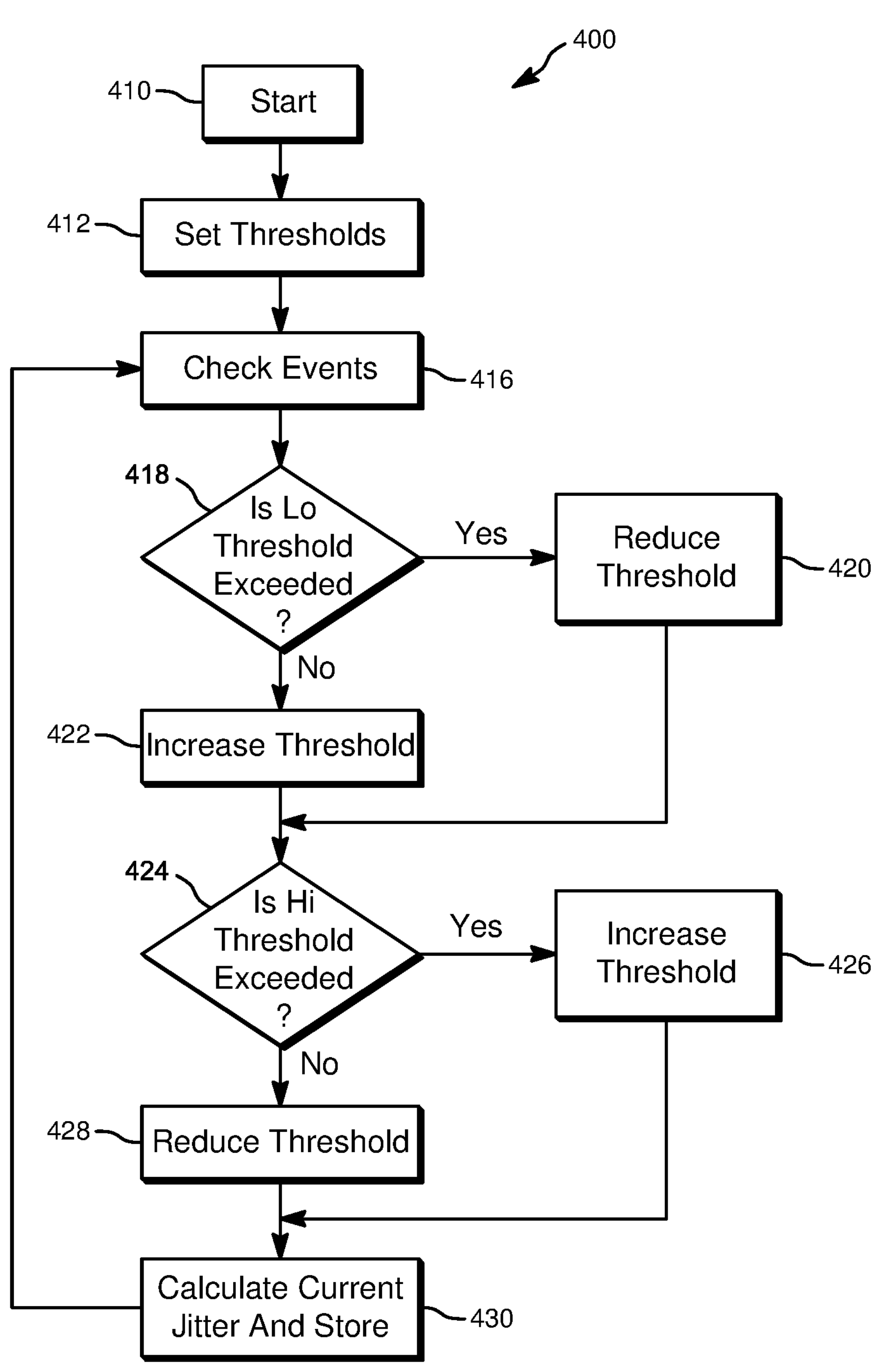
FIG. 6 shows another exemplary method according to embodiments of the present disclosure.

FIG. 6 shows an alternate exemplary method 400 that measures jitter according to embodiments disclosed in this specification. The method 400 again uses independently adjustable high (Hi) and low (Lo) thresholds to rapidly ascertain the "jitter depth" of a queue by adjusting each threshold to a position in the queue that approximates an instantaneous position at which jitter will cause the respective threshold to be exceeded. This is accomplished by independently expanding and contracting the threshold levels outwards/inwards, depending on whether the respective threshold is being exceeded or not.

Specifically, the exemplary method 400 begins at step 410 and at step 412 both the high and low thresholds are set. At step 416 the high and low threshold events are checked. At step 418, if the low threshold is exceeded then the low threshold is reduced (relaxed) at step 420 whereas if the threshold is not exceeded then at step 422 the low threshold is raised (tightened). Similarly, at step 424 if the high threshold is exceeded the high threshold is increased (relaxed) whereas if the threshold is not exceeded the high threshold is lowered (tightened). At step 430, based on the current position of the high and low thresholds, the current jitter is calculated and stored, and the method reverts to step 416.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A remote device in a distributed access architecture of a communications network, the remote device operatively connected to a core providing data to the remote device, the remote device including a dejitter buffer and a processor configured to measure an amount of jitter in the communications network based on a measured queue depth in the dejitter buffer relative to a first adjustable threshold and a second adjustable threshold;

wherein said first adjustable threshold and said second adjustable threshold are adjusted based on said measured queue depth; and wherein said amount of jitter is calculated based on a difference between said first adjustable threshold and said second adjustable threshold.

2. The remote device of claim 1 where the dejitter buffer includes a plurality of queues.

3. The remote device of claim 2 where the processor is configured to measure the amount of jitter based on a measured depth of each of the plurality of queues relative to a plurality of adjustable thresholds associated with each queue.

4. The remote device of claim 1 where the queue depth is measured relative to said first adjustable threshold independently of a measurement relative to said second adjustable threshold.

5. The remote device of claim 1 where each adjustable threshold is adjusted based on detection that the respective threshold is crossed by said measured queue depth.

6. The remote device of claim 1 where the amount of jitter is calculated based on a determined interpacket gap.

7. The remote device of claim 1 where the processor is configured to adjust at least one threshold based on a delay.

8. The remote device of claim 7 where the processor is configured to adjust at least one threshold without the delay.

9. A method of measuring current jitter in a queue of a remote device in a distributed access architecture of a communications network, the method comprising:

measuring a queue depth in the dejitter buffer relative to each of a first adjustable and a second adjustable threshold;

adjusting said first adjustable threshold and said second adjustable threshold based on said measured queue depth; and measuring an amount of jitter using a difference between said first adjustable threshold and said second adjustable threshold.

10. The method of claim 9 implemented in at least one of an RPD and an RMD.

11. The method of claim 9 where the dejitter buffer includes a plurality of queues.

12. The method of claim 11 where the amount of jitter is measured based on a measured depth of each of the plurality of queues relative to a plurality of adjustable thresholds associated with each queue.

13. The method of claim 9 where the queue depth is measured relative to said first adjustable threshold independently of a measurement relative to said second adjustable threshold.

14. The method of claim 9 where each adjustable threshold is adjusted based on detection that the respective threshold is crossed by said measure queue depth.

15. The method of claim 9 where the amount of jitter is measured based on a determined interpacket gap.

16. The method of claim 9 where at least one threshold is adjusted based on a delay.

17. The method of claim 16 where at least one threshold is adjusted without the delay.

* * * * *